United States Patent
Wu

(10) Patent No.: US 7,217,000 B2
(45) Date of Patent: May 15, 2007

(54) DIRECT TYPE BACKLIGHT WITH SUPPORT RODS INTEGRAL WITH DIFFUSER BOARD

(75) Inventor: Chih-Kang Wu, Taotyan Hsien (TW)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 10/773,331

(22) Filed: Feb. 9, 2004

(65) Prior Publication Data

US 2004/0156185 A1    Aug. 12, 2004

(30) Foreign Application Priority Data

Feb. 10, 2003  (TW) ............................ 92102690 A

(51) Int. Cl.
*F21V 17/001*   (2006.01)
*G09F 13/04*   (2006.01)

(52) U.S. Cl. .......................................... 362/97; 349/64

(58) Field of Classification Search .................. 362/31, 362/29, 30, 632–634, 306, 97; 349/58, 64
See application file for complete search history.

(56) References Cited

U.S. PATENT DOCUMENTS

| | | | |
|---|---|---|---|
| 6,407,781 B2 * | 6/2002 | Kitada | 349/58 |
| 6,652,109 B2 * | 11/2003 | Nakamura | 362/31 |
| 6,902,300 B2 * | 6/2005 | Lee | 362/306 |
| 2002/0113924 A1 * | 8/2002 | Saito et al. | 349/112 |
| 2004/0257792 A1 * | 12/2004 | Yu et al. | 362/31 |

FOREIGN PATENT DOCUMENTS

JP        10-326517      *  8/1998

* cited by examiner

*Primary Examiner*—Sandra O'Shea
*Assistant Examiner*—James W Cranson, Jr.
(74) *Attorney, Agent, or Firm*—Troxell Law Office, PLLC

(57) ABSTRACT

A back light module in which the diffuser board has integrated bottom support rods that are stopped at the bottom wall of the lamp case of the back light module to support the diffuser board in shape and to protect the diffuser board against deformation when the diffuser board installed in the lamp case.

4 Claims, 3 Drawing Sheets

DIRECT TYPE BACKLIGHT WITH SUPPORT RODS INTEGRAL WITH DIFFUSER BOARD

BACKGROUND OF THE INVENTION

1. Field of the Invention

The present invention relates to a back light module, and more particularly, to a back light module in which the diffuser board has bottom support rods that support the diffuser board in shape.

2. Description of the Related Art

A back light module is an essential assembling component of the display screen of a notebook computer or LCD monitor, generally including a lampshade or lamp case, lamp tubes fixedly mounted in the lampshade or lamp case, and a diffuser board (light guide plate). FIG. 1 illustrates a back light module according to the prior art. According to this design, lamp tubes B are fixedly mounted inside a casing A, and a diffuser board C is suspending above the lamp tubes B. This design of back light module is not satisfactory in function because the diffuser board C tends to curve inwards due to the effect of its gravity weight and ambient temperature and moisture. FIG. 2 shows another design of back light module in which support members D are mounted inside the casing A to support the diffuser board C above the lamp tubes B. This design eliminates the drawback of the design shown in FIG. 1, however its manufacturing cost is high. Further, because the support members D are respectively and perpendicularly fastened to the bottom wall of the casing A by a respective screw joint, it is difficult to keep the top ends of the support members D in flush.

SUMMARY OF THE INVENTION

The present invention has been accomplished under the circumstances in view. It is one object of the present invention to provide a back light module, which protects the diffuser board against deformation. It is another object of the present invention to provide a back light module, which is inexpensive to manufacture. To achieve these and other objects of the present invention, the back light module comprises a lamp case, a plurality of lamp tubes fixedly mounted inside the lamp case, and a diffuser board fastened to the top open side of the lamp case and suspending above the lamp tubes. The diffuser board has a plurality of bottom support members formed integral with the bottom wall thereof and respectively stopped at the bottom wall of the lamp case to support the diffuser board against deformation.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
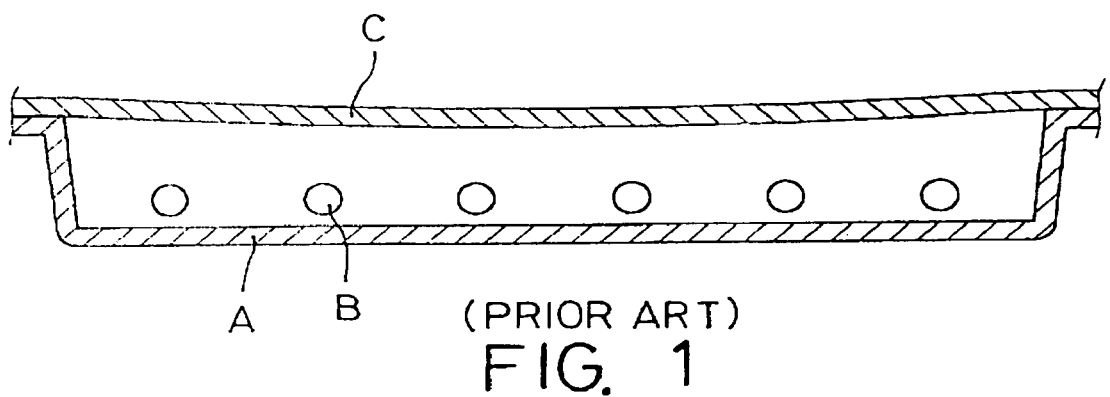
FIG. 1 is a sectional view showing a back light module according to the prior art.
Figure 2:
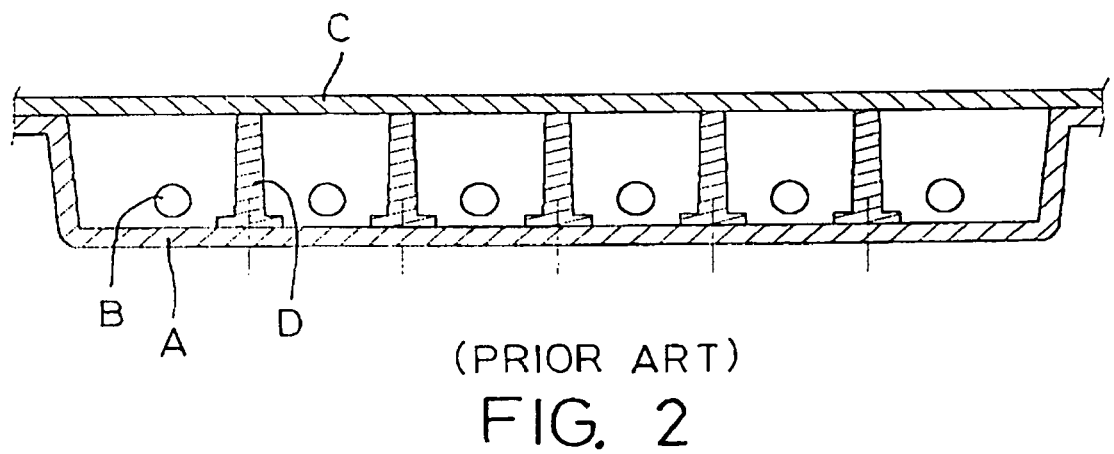
FIG. 2 is a sectional view showing another design of back light module according to the prior art.
Figure 3:
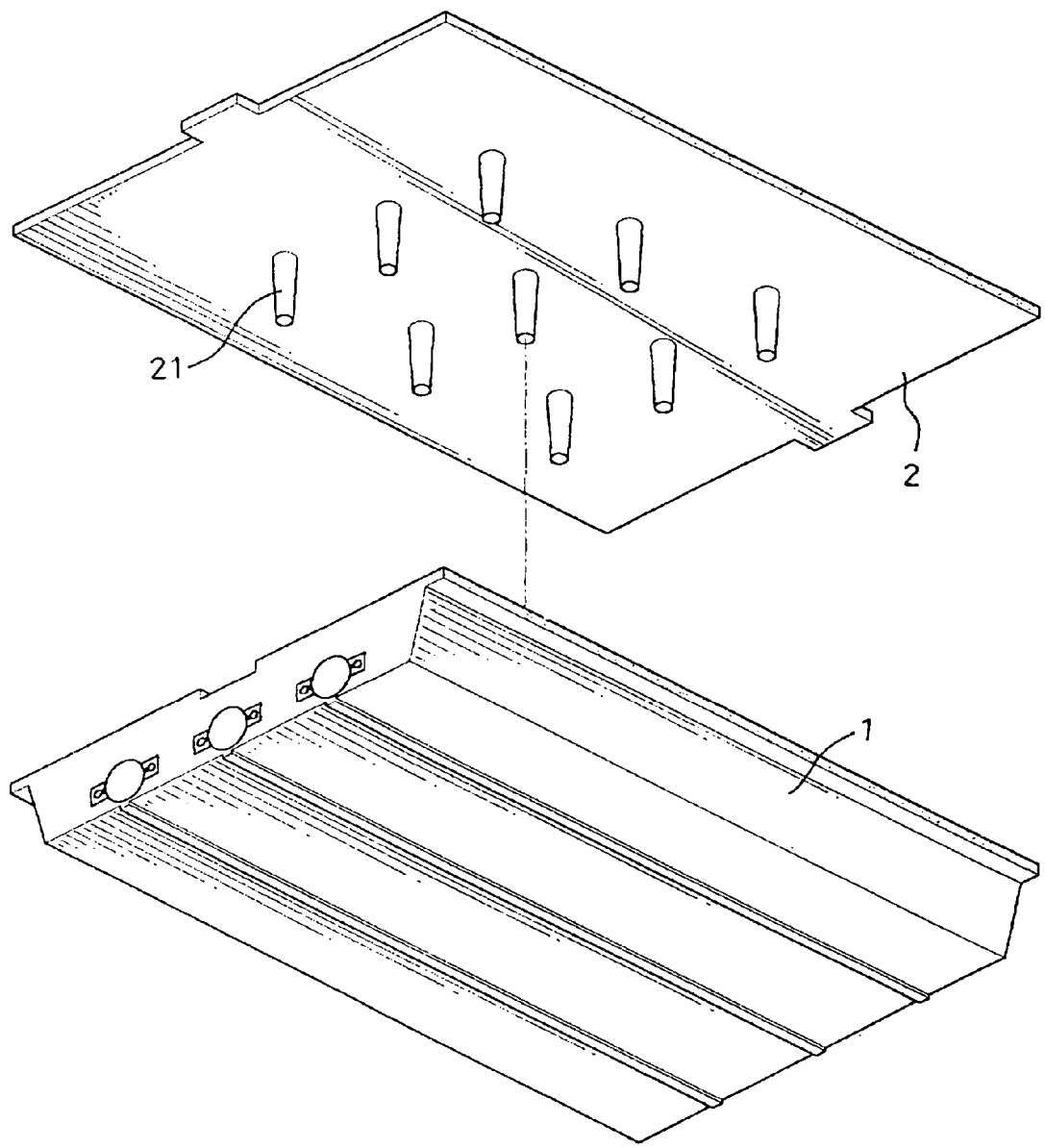
FIG. 3 is an exploded view of the preferred embodiment of the present invention.
Figure 4:
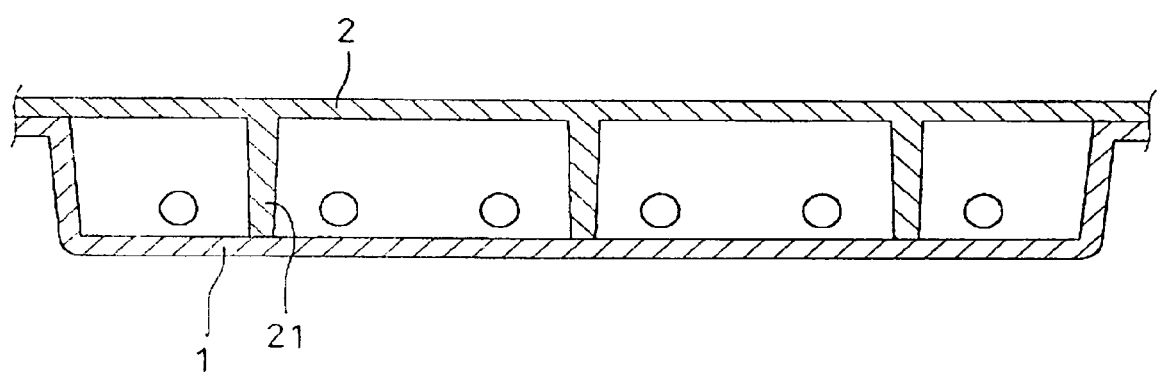
FIG. 4 is a sectional assembly view of the preferred embodiment of the present invention.

Referring to FIGS. 3 and 4, a back light module in accordance with the present invention is shown comprised of a lamp case 1, a plurality of lamp tubes (not shown) mounted inside the lamp case 1, and a diffuser board 2 fastened to the top open side of the lamp case 1. The lamp case 1 is preferably made of metal. The diffuser board 2 has a plurality of bottom support rods 21 respectively formed integral with and perpendicularly extended from the bottom sidewall thereof to a distance corresponding to the depth of the lamp case 1. The bottom support rods 21 are equal in length (height). The bottom support rods 21 are preferably injection molded with the diffuser board 2 from acrylics.

When the diffuser board 2 covered on the top open side of the lamp case 1, the bottom support rods 21 are positively stopped at the bottom wall of the lamp case 1 to support the diffuser board 2 in shape, preventing deformation of the diffuser board 2 due to the effect of ambient temperature and moisture.

A prototype of back light module has been constructed with the features of FIGS. 3 and 4. The back light module functions smoothly to provide all of the features discussed earlier.

Although a particular embodiment of the invention has been described in detail for purposes of illustration, various modifications and enhancements may be made without departing from the spirit and scope of the invention. For example, an independent battery case can be provided and detachably fastened to the cap body to hold the battery set. Accordingly, the invention is not to be limited except as by the appended claims.

The invention claimed is:

1. A back light module comprising a lamp case, said lamp case having a bottom wall and a top open side, a plurality of lamp tubes fixedly mounted inside said lamp case, and a diffuser board fastened to the top open side of said lamp case and suspending above said lamp tubes, wherein said diffuser board has a plurality of bottom support members formed integral with a bottom wall of said diffuser board and respectively stopped at the bottom wall of said lamp case to support said diffuser board against deformation.

2. The back light module of claim 1, wherein said bottom support members are respectively perpendicularly extended from the bottom wall of said diffuser board.

3. The back light module of claim 1, wherein said bottom support members are injection-molded with said diffuser board in integrity.

4. The back light module of claim 1, wherein said diffuser board is made of acrylics.

* * * * *